United States Patent
Namgung

(10) Patent No.: US 8,442,062 B2
(45) Date of Patent: May 14, 2013

(54) GROUP COMMUNICATION SYSTEM USING MEDIA SERVER HAVING DISTRIBUTED STRUCTURE AND METHOD THEREOF

(75) Inventor: Hwan-Sik Namgung, Seoul (KR)

(73) Assignee: Haedenbridge Co., Ltd, Seoul (KR)

( * ) Notice: Subject to any disclaimer, the term of this patent is extended or adjusted under 35 U.S.C. 154(b) by 285 days.

(21) Appl. No.: 12/808,502

(22) PCT Filed: Dec. 20, 2007

(86) PCT No.: PCT/KR2007/006700
§ 371 (c)(1),
(2), (4) Date: Jun. 16, 2010

(87) PCT Pub. No.: WO2009/082041
PCT Pub. Date: Jul. 2, 2009

(65) Prior Publication Data
US 2011/0158233 A1    Jun. 30, 2011

(51) Int. Cl.
*H04L 12/56* (2006.01)
(52) U.S. Cl.
USPC ............ 370/401; 370/235; 370/400; 709/228
(58) Field of Classification Search .................. None
See application file for complete search history.

(56) References Cited

U.S. PATENT DOCUMENTS

| | | | | |
|---|---|---|---|---|
| 5,983,005 A | * | 11/1999 | Monteiro et al. | 709/231 |
| 6,119,163 A | * | 9/2000 | Monteiro et al. | 709/227 |
| 6,163,810 A | * | 12/2000 | Bhagavath et al. | 709/238 |
| 6,704,576 B1 | * | 3/2004 | Brachman et al. | 455/503 |
| 7,443,851 B2 | * | 10/2008 | Fukushima et al. | 370/390 |
| 7,710,961 B2 | * | 5/2010 | Miller et al. | 370/390 |
| 2004/0028036 A1 | * | 2/2004 | Mose et al. | 370/353 |
| 2004/0117507 A1 | * | 6/2004 | Torma | 709/248 |
| 2006/0047836 A1 | * | 3/2006 | Rao et al. | 709/229 |
| 2006/0129487 A1 | * | 6/2006 | Shafiee et al. | 705/50 |
| 2007/0133565 A1 | | 6/2007 | Hyun et al. | |

FOREIGN PATENT DOCUMENTS

KR    10-2004-0053722 A    6/2004

OTHER PUBLICATIONS

Written Opinion of the International Searching Authority for PCT Application No. PCT/KR2007/006700.

* cited by examiner

*Primary Examiner* — Donald Mills
(74) *Attorney, Agent, or Firm* — LRK Patent Law Firm

(57) ABSTRACT

A group communication method in a terminal is provided, which includes: receiving session information and connection management server information; checking whether there is a connection terminal pre-connected to a session corresponding to the session information on own network; when there is the connection terminal at the check result, accessing to a media server that the pre-connected terminal accesses; when there is no connection terminal at the check result, receiving a media server list by accessing to the connection management server based on the connection management server information; selecting and accessing to a media server in the provided media server list; and performing group communication through the session object on the same session.

13 Claims, 4 Drawing Sheets

GROUP COMMUNICATION SYSTEM USING MEDIA SERVER HAVING DISTRIBUTED STRUCTURE AND METHOD THEREOF

TECHNICAL FIELD

The present invention relates to a group communication system using a media server having a distributed structure, a method thereof and a computer-readable recording media recording a program for realizing the method; and, more particularly, to a group communication system using a media server having a distributed structure in which a plurality of distributed media servers can process a massively distributed connection terminal while maintaining session synchronization such that locally distributed massive connection terminals can receive a service in real-time without quality damage on the same session, and which enables group communication and interactive broadcasting through interactive multicasting/unicasting transform to maximally reduce occurring of network traffic on a network when there are the majority of massively distributed connection terminals on the same network, a method thereof and a computer-readable recording media recording a program for realizing the method.

BACKGROUND ART

Generally, when a packet data transmission method for group communication on Internet is divided in view of a transmitter and a receiver attending transmission, the packet data transmission method is divided into a unicasting transmission method, a broadcasting transmission method, and a multicasting transmission method.

To be specific, the unicasting transmission method is a one-to-one transmission method that one transmitter, i.e., a server or a terminal, transmits a data packet to another receiver, i.e., a server or a terminal, and has a benefit that the data packet is stably transmitted. However, when the server transmits the same data to a plurality of receivers, the data should be respectively transmitted to the receivers to receive the data. Accordingly, it causes excessive load to the server and transmission efficiency of a network is lowered. At this time, the more the number of receivers increases, the more the problems increase.

The broadcasting transmission method is a method that one transmitter transmits data to the entire receivers on sub-network and has a benefit that the same data are transmitted to the receivers at a time. However, there is also a shortcoming that the receiver not to receive the data should receive the data.

Since the multicasting transmission method is a point-to-multipoint or multipoint-to-multipoint data packet transmission method for simultaneously transmitting a data packet to the terminals requiring data on the same network segment, the multicasting transmission method is proper to group communication as a superior data transmission method.

To have a look at a difference between packets transmitted by the multicasting transmission method and the unicasting transmission method, according to the unicasting transmission method, an Internet application program on Transmission Control Protocol/Internet Protocol (TCP/IP) that the data transmitter marks an Internet Protocol (IP) address of the receiver on a header of the transmission packet and transmits the packet. However, according to the multicasting transmission method, an address of a group that the receivers attend is marked on the header instead of an address of the receiver and the data packet is transmitted. At this time, the group address for multicasting transmission is a D-Class IP address (224.0.0.0~239.255.255.255) and does not represent an actual host differently from A, B, C-Class IP addresses which represent each worldwide Internet host. Accordingly, the receiver receiving the multicasting packet having the group address determines whether the receiver is included in the packet group and determines whether the receiver accepts the packet.

Currently, since a router on Internet generally does not support the multicasting transmission method, the router transmits a packet encapsulated according to a technique called Tunneling between multicasting routers in order to transmit a multicasting packet on Internet. That is, when the multicasting packet goes through general routers which do not support the multicasting transmission method by adding an IP address of both ends of the tunnel set up between the multicasting routers in front of the header of the data packet having the multicasting address, the multicasting packet is routed by the general routers according to the unicasting data packet transmission method and is finally transmitted to a destination of the tunnel. However, since the unicasting transmission method only supports one-way transmission, it is not proper to the system for real-time interactive communication.

Although there is a group communication method using the unicasting transmission method as well as a group communication method using the conventional multicasting transmission method on Internet, as described above, the unicasting transmission method has the problems that the service is provided to only a few users at a time and a group communication service of a high-quality is not provided to a plurality of receivers due to network traffic generated by respectively transmitting the data packet to the receivers.

As another conventional technology for solving the problem, there is "A method for communication in groups using conversion between multicasting style and unicasting style," KR Patent No. 10-0586025 issued to Haedenbridge Co., Ltd. on May 26, 2006, which is suggested by the same invention, Namgung, Hwan-Sik as that of this application.

The above patent relates to a method for real-time communication among a plurality of terminals in groups based on interactive multicasting/unicasting conversion on Internet where multicasting packet communication is not supported without increasing of network traffic, and a computer-readable recording media recording a program for realizing the method. To be specific, the group communication method in a group communication system, includes a first step of collecting network information of a terminal accessing for group communication; a second step of checking whether there is another pre-accessing terminal having network information same as the collected network information; a third step of allowing a right for mutually transforming the multicasting packet data into unicasting packet data, and the unicasting packet data into multicasting packet data to a terminal when there is another pre-accessing terminal at the check result, and not allowing the right to the terminal when there is no pre-accessing terminal; and transmitting the unicasting packet data transmitted from the authorized terminal on network to an authorized terminal on another network.

In addition, the group communication method in the terminal includes a first step of logging in the group communication system by a terminal; a second step of allowing a right for mutually transforming multicasting packet data into unicasting packet data, and unicasting packet data into multicasting packet data by a terminal when there is no terminal having network information which is the same as that of the terminal logging in the group communication system; and a third step of transforming multicasting packet data generated in the network including the terminal into unicasting packet data in real-time and transmitting the unicasting packet data to the group communication system, or transforming the unicasting packet data transmitted from the group communication system into multicasting packet data in real-time and transmitting the multicasting packet data to another terminals on own network.

In order to provide interactive group communication or interactive broadcasting to massive distribution terminals in the same session on IP network, a communication method among a plurality of distributed media servers for synchronizing the same sessions and an connection management operating method for connecting a predetermined media server to the massive distribution terminals to receive an optimal service are required. When the distribution terminals are on the same network, a special data transmission method for maintaining network traffic at minimum is required.

A conventional distribution technology of media servers concentrates on a Contents Delivery Network (CDN) field for distributing media contents in the distributed media server in order to distribute overload of Central Processing Unit (CPU) for controlling network load distribution and connection terminal process of the media server mainly in one-way media streaming.

DISCLOSURE

Technical Problem

An object of the present invention is to solve the problem that the conventional technology cannot process massive connectors and network traffic while maintaining a two-way in real-time.

Accordingly, an embodiment of the present invention is directed to provide a group communication system using a media server having a distributed structure in which a plurality of distributed media servers can process a massively distributed connection terminal while maintaining session synchronization such that locally distributed massive connection terminals can receive a service in real-time without quality damage on the same session, and which enables group communication and interactive broadcasting through interactive multicasting/unicasting transform to maximally reduce occurring of network traffic on a network when there are the majority of massively distributed connection terminals on the same network, a method thereof and a computer-readable recording media recording a program for realizing the method.

The objects of the present invention are not limited to the above-mentioned ones. Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a group communication method using a media server having a distributed structure in a terminal, including: receiving session information and connection management server information; checking whether there is a connection terminal pre-connected to a session corresponding to the session information on own network; when there is the connection terminal at the check result, accessing to a media server that the pre-connected terminal accesses; when there is no connection terminal at the check result, receiving a media server list by accessing to the connection management server based on the connection management server information; selecting and accessing to a media server in the media server list; and performing group communication through the session object on the same session.

In accordance with another aspect of the present invention, there is provided a group communication method using a media server having a distributed structure, including: when there is a session object requested by a terminal, registering the terminal on a terminal list corresponding to the session object and notifying it to a connection management server; when there is no session object requested by a terminal, checking whether there is a session object in another media server through the connection management server; when there is the session object at the check result, accessing to another media server and notifying it to the connection management server; when there is no session object at the check result, creating a session object, registering the terminal on the terminal list and notifying it to the connection management server; and providing group communication to the terminals accessing to the same session through the session object.

In accordance with another aspect of the present invention, there is provided a group communication system using a media server having a distributed structure, including: a storing means for storing session information and connection management server information; an information providing means for providing session information and connection management server information corresponding to a session requested by a terminal; a connection management means for updating a session list of each media server, a terminal list corresponding to each session object of each media server, and a media server list; and at least one media server for creating/removing a session object, updating the terminal list corresponding to each session object and the media server list, and providing group communication to terminals accessing to the same session through the session object.

In accordance with another aspect of the present invention, there is provided a computer-readable recording media recording a program for realizing following functions in a terminal having a processor, the functions including: receiving session information and connection management server information; checking whether there is a connection terminal pre-connected to a session corresponding to the session information on own network; when there is the connection terminal at the check result, accessing to the media server that the pre-connected terminal accesses; when there is no connection terminal at the check result, receiving a media server list by accessing to the connection management server based on the connection management server information; selecting and accessing to the media server on the media server list; and performing group communication on the same session through the session object.

In accordance with another aspect of the present invention, there is provided a computer-readable recording media recording a program for realizing following functions in a media server for providing group communication, the functions including: when there is a session object requested by a terminal, registering the terminal on a terminal list corresponding to the session object and notifying it to a connection management server; when there is no session object requested by a terminal, checking through the connection management server whether there is a session object in another media server; when there is the session object in another media server at the check result, accessing to another media server and notifying it to the connection management server; when there is no session object in another media server at the check result, creating a session object, registering the terminal on the terminal list and notifying it to the connection management server; and providing group communication to the terminals accessing to the same session through the session object.

Advantageous Effects

According to the present invention, a plurality of distributed media servers can process a massively distributed connection terminal while maintaining session synchronization such that locally distributed massive connection terminals can receive a service in real-time without quality damage on the same session, and group communication and interactive broadcasting can be performed through interactive multicasting/unicasting transform to maximally reduce occurring of network traffic on a network when there are the majority of massively distributed connection terminals on the same network.

The present invention can replace an interactive satellite communication and broadcasting system such as a very small aperture terminal (VSAT) while maintaining high-quality and economical advancement by realizing massive group communication or interactive broadcasting based on clustering and multicasting/unicasting transform of the media servers distributed on diverse networks. The present invention also enables process of massive connectors in the same session while minimizing traffic generation of the network in massive real-time interactive remote education, entertainment requiring interactive event relay, interactive seminar relay, public fields for incidence and distress response, and interactive home shopping.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

In the present invention, group communication includes a video conference, remote education solution, interactive multimedia broadcasting, panel image conference relay, massive real-time interactive education, home shopping, commercial home shopping, auction and entertainment. In addition, a group means a network connection state that terminals included in a network of different regions or the same region can communicate each other in real-time on an Internet Protocol (IP) network.

Figure 1:
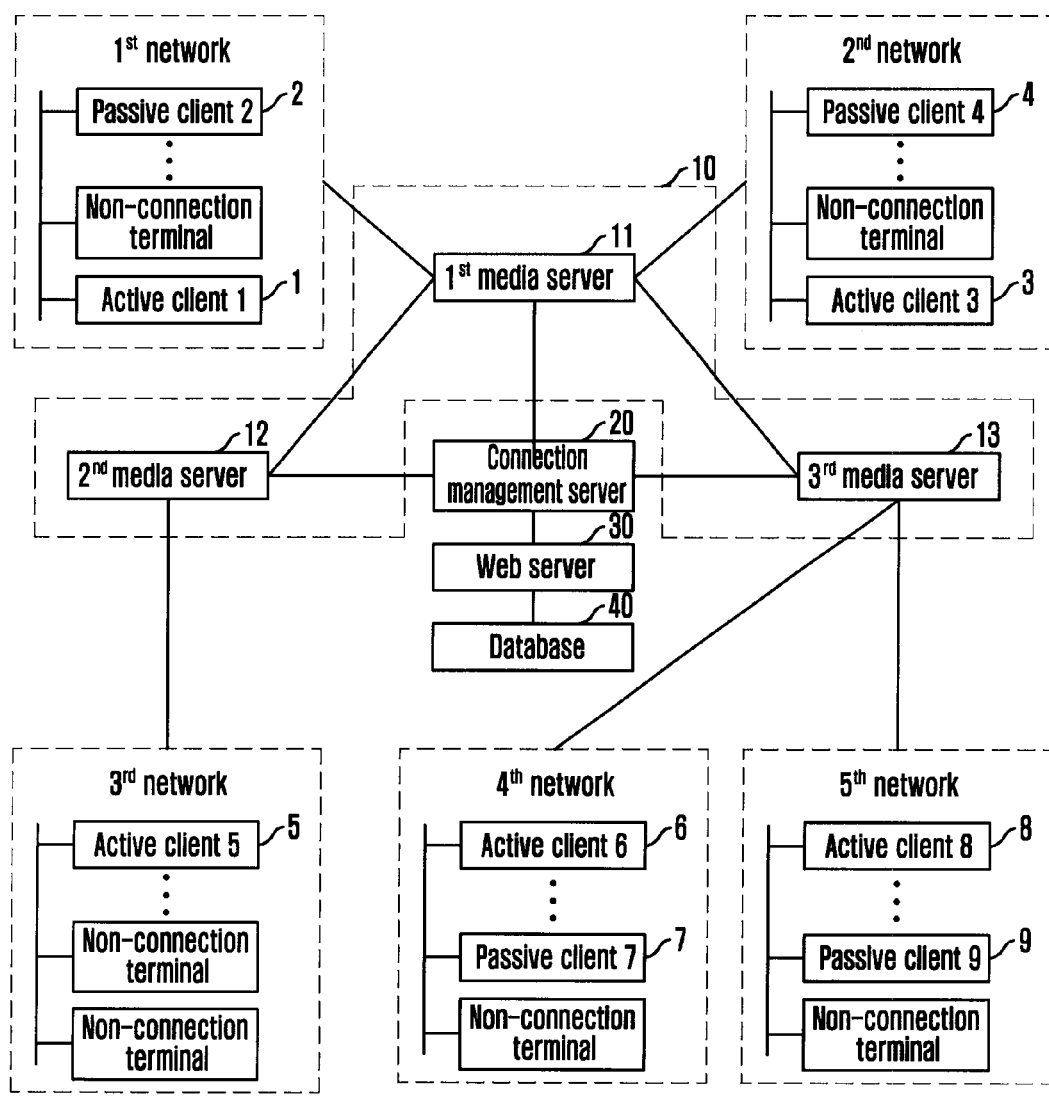
FIG. 1 is a block diagram showing a group communication system using a media server having a distributed structure in accordance with an embodiment of the present invention.

FIG. 1 is a block diagram showing a group communication system using a media server having a distributed structure in accordance with an embodiment of the present invention.

As shown in FIG. 1, the group communication system using the media server having the distributed structure in accordance with the present invention includes a database 40, a web server 30, a connection management server 20, and a media server 10, i.e., a data transferring server. The database 40 stores session information and connection management server information. The web server 30 provides session information corresponding to a session requested by a terminal, and the connection management server information. The connection management server 20 manages a media server list and updates a session list of each media server, a terminal list corresponding to each session object of the media servers, and the media server list. The media server creates/removes the session object, updates the terminal list and the media server list corresponding to each session object, and provides group communication to terminals accessing to the same session through the session object.

Each network includes active clients 1,3,5,6 and 8, and a plurality of passive clients 2, 4, 7 and 9 forming a group with each active client. When the number of groups increases, the number of active clients increases. A non-connection terminal on each network is individually clarified to be divided from the connection terminals.

* Each constituent element will be described in detail hereinafter.

The web server 30 is a server that terminals initially access and processes login for user authentication, multicasting group address/port setup of each session, and connection with the database 40 having a user account and diverse setup data.

The connection management server 20 is a server managing connection of the terminals accessing to the session and responds differently according to connection types. The connection types include a general user terminal access, a managing terminal access and a media server access according to a user class.

A main role of the connection management server 20 is to provide a media server list to massively distributed terminals in order to provide a data transmission service, and to provide, maintain and manage information corresponding to the connection type.

The media server 10 transmits data generated on the session to a terminal connected to the media server and another media server connected to the same session.

A constructive relation among information inside the session list respectively managed in the connection management server and the media server, the media server list corresponding to each object, and the terminal list will be described with reference to FIGS. 3 to 5. Contents of FIGS. 3 to 5 will be described without considering a connection relation of FIG. 1.

For example, two sessions 1 and 2 are serviced by first, second and third media servers and a state of a terminal directly accessing to each media server and receiving the service is as shown in Table 1.

TABLE 1

|  | Media server 11 | Media server 12 | Media server 13 |
| --- | --- | --- | --- |
| Session 1 | Terminal 1, Terminal 2 | Terminal 3, Terminal 4 | Terminal 5 |
| Session 2 | Terminal 6, Terminal 7 |  | Terminal 8, Terminal 9 |

In order to provide the service, the session 1 is supported by the first, second and third media servers and the terminals 1 and 2 are connected to the first media server. The terminals 3 and 4 are connected to the second media server and the terminal 5 is connected to the third media server.

In addition, the session 2 is supported by the first and third media servers, and the terminals 6 and 7 are connected to the first media server. The terminals 8 and 9 are connected to the third media server.

Figure 3:
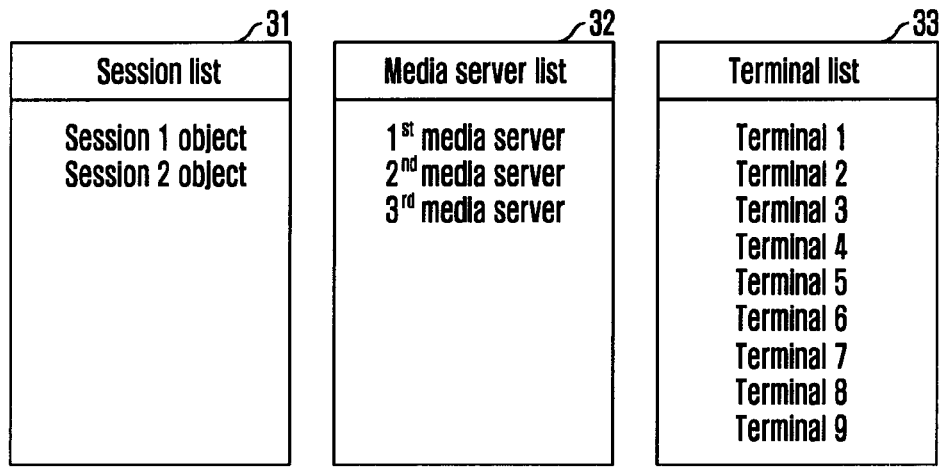
FIGS. 3 to 4 show a constructive relation among information inside the session list respectively managed in a connection management server and a media server, a media server list corresponding to each object, and a terminal list in accordance with an embodiment of the present invention.

As shown in FIG. 3, the connection management server 20 maintains a session list 31 including session 1 and 2 objects, a media server list 32 including the first, second and third media servers, and a terminal list 33 including the terminals 1 to 9 in the above state.

Figure 4:
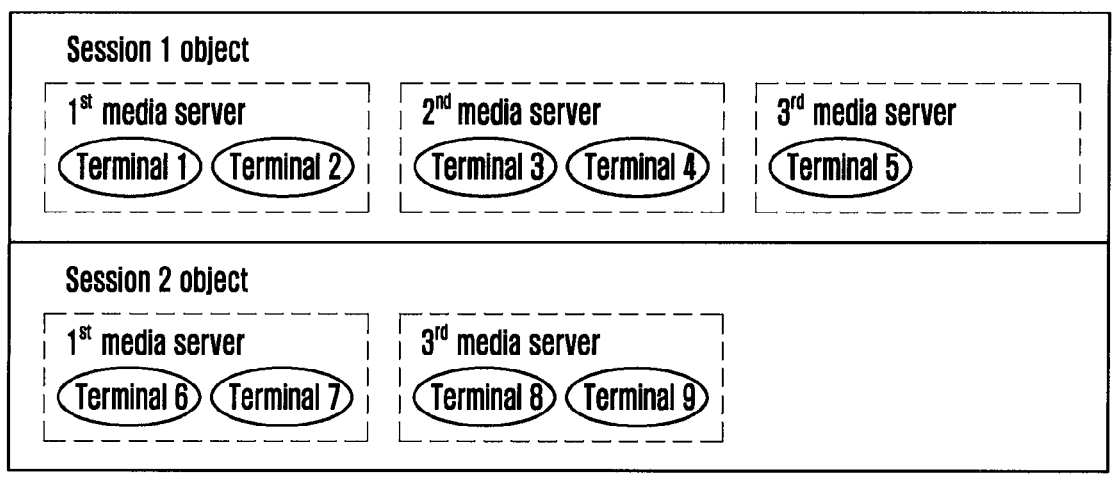

At this time, relation among the constituent elements inside the session list 31, the media server list 32 and the terminal list 33 is shown as a structure of a session object as shown in FIG. 4.

Figure 5:
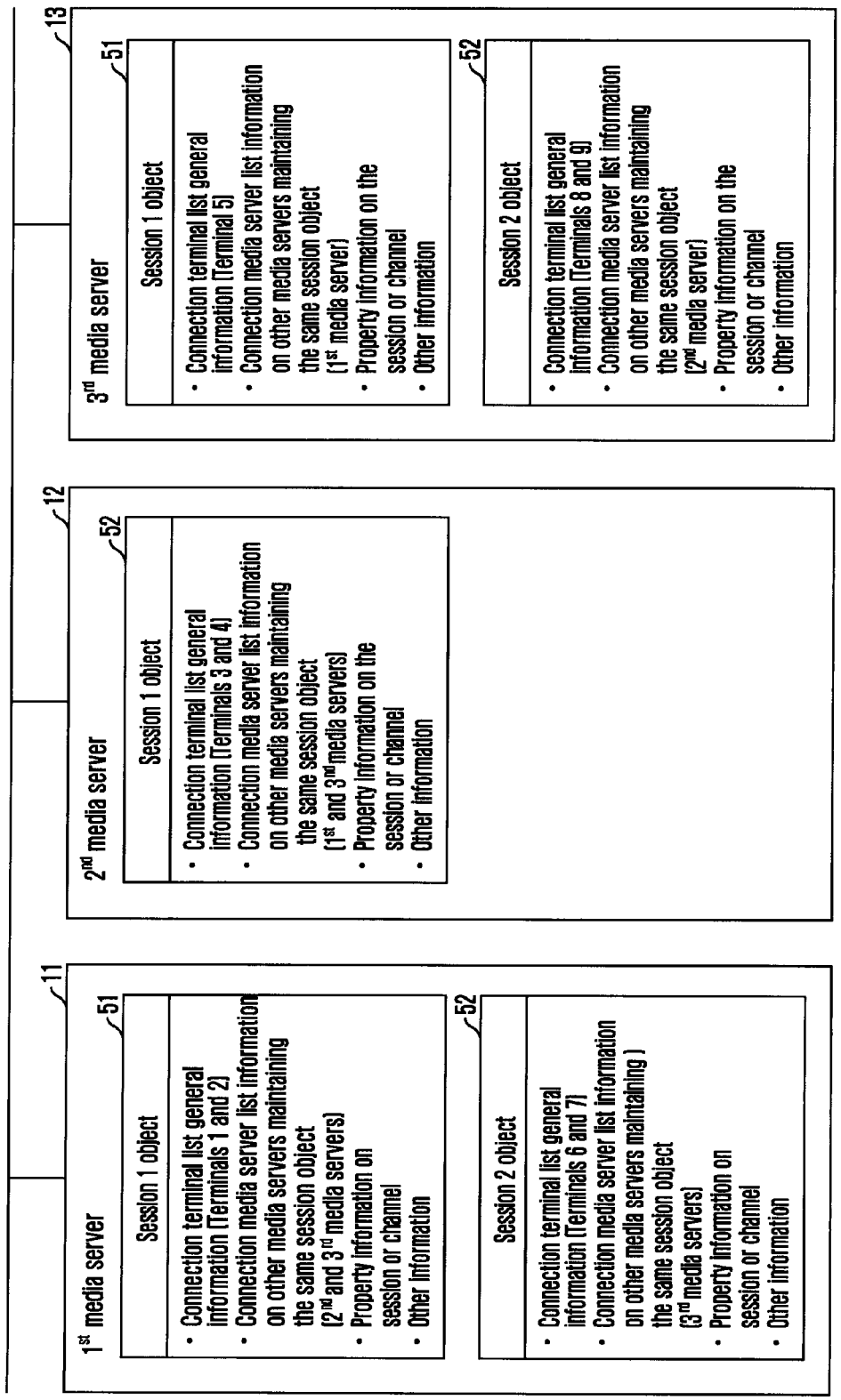
FIG. 5 describes a configuration of a session object inside each media server in the above state in accordance with an embodiment of the present invention.

FIG. 5 describes a configuration of the session object inside the media servers in the above state. That is, the session object includes a terminal list having information on terminals directly connected to each media server, a media server list having information on other media servers maintaining the same session object, network information of terminals directly connected to each media server and other additional information related to the session.

As shown in FIG. 5, the first media server maintains a session 1 object 51 and a session 2 object 52, and the second media server maintains a session 1 object 52. The third media server maintains the session 1 object 51 and the session 2 object 52.

Accordingly, media data generated in the session 1 are transmitted/received among terminals accessing to the session of each media server through clustering of the first, second, and third media servers. Media data generated in the session 2 are transmitted/received among terminals accessing to the session of each media server through clustering of the first and third media servers.

Figure 2:
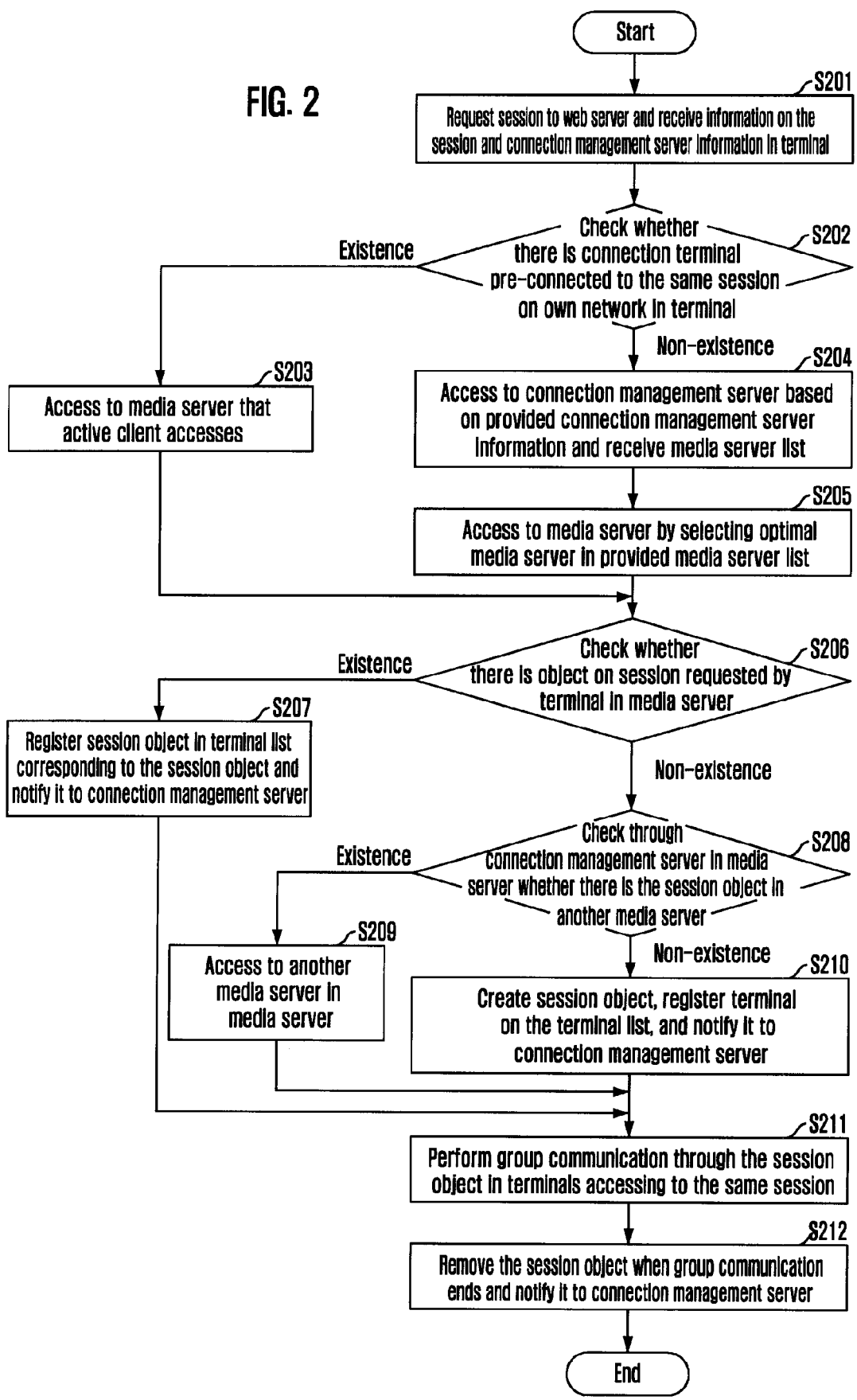
FIG. 2 is a flowchart illustrating a group communication method using a media server having a distributed structure in accordance with an embodiment of the present invention.

FIG. 2 is a flowchart illustrating a group communication method using a media server having a distributed structure in accordance with an embodiment of the present invention.

The connection management server 20 for massive group communication, the web server 30 for providing connection information required for connection to the connection management server 20 to the terminals, and the database 40 storing the connection information are driven and prepared in a waiting state.

In addition, at least one media server 10 for smooth media transmission among locally distributed user terminal groups is registered in the connection management server 20 and waits in a service preparing state.

When a terminal logs in the web server 30 in order to attend the group communication, the web server 30 performs an authentication procedure.

At step S201, the terminal requests a session to the web server 30 and receives session information including a network address, a multicasting group address and a port number, and connection management server information. For example, when the terminal selects a desired communication group or moving picture providing room on a web page provided from the web server 30, the web server 30 provides the session information corresponding to the communication group or the moving picture providing room to the terminal.

At step S202, after the terminal transmits Echo through the provided session information, the terminal checks whether there is a connection terminal pre-connected to the session requested on own network according to a response message analysis result. At this time, a response message includes media server information that the terminal responding to the Echo accesses.

At step S203, when there is the connection terminal at the check result of the step S202, the logic flow goes to the step S206 after the terminal accesses to the media server 10 that the connection terminal accesses.

At step S204, when there is no connection terminal at the check result of the step S202, the terminal accesses to the connection management server 20 based on the provided connection management server information and receives a media server list.

At this time, the media server list includes media server information on the shortest route, media server information having the largest available bandwidth, media server information having the smallest number of the connection terminals, and media server information set up by the user.

At step S205, the terminal accesses to the media server by selecting an optimal media server in the provided media server list.

The optimal media server selecting method selects the media server on the shortest route, the media server having the largest available bandwidth, the media server having the smallest number of the connection terminals, or the media server set up by the user. In addition, since the terminal is a terminal initially accessing to the session on own network, the terminal becomes an active client of the network performing a multicasting/unicasting transform function.

Since the detailed function of the active client is described in KR Patent titled "A method for communication in groups using conversion between multicasting style and unicasting style," KR Patent No. 10-0586025 issued to Haedenbridge Co., Ltd. on May 26, 2006, which is suggested by the same invention, Namgung, Hwan-Sik as that of this application, it will be provided herein in brief.

The active client performs a function of transforming a unicasting image/speech/data packet transmitted from the media server 10 into a multicasting packet and transmitting the multicasting packet to other terminals connected to the session on own access network. Otherwise, the active client transforms a multicasting image/speech/data packet to be transmitted to the session on own network into unicasting packet data and transmits the unicasting packet data to the media server 10. Accordingly, network traffic generated in massive group communication or interactive broadcasting is remarkably reduced.

Since the terminals connected to the session on a network should receive a packet from the media server 10 according to a unicasting transmission method when there is no concept of the active client, overload of the media server 10 occurs and network traffic occurring between the network and the router increases.

At step S206, the media server 10 checks whether there is an object on the session requested by the terminal. At this time, the session object relays diverse data generated in the session inside the media server.

At step S207, when there is the session object at the check result of the step S206, the media server 10 registers the session object in the terminal list corresponding to the session object, notifies the session object to the connection management server 20 and goes to the step S211.

When there is no session object at the check result of the step S206, the media server 10 checks at step S208 through the connection management server 20 whether there is the session object in another media server.

When there is the session object in another media server at the check result of the step S208, the media server 10 accesses to another media server based on another media server information of the connection management server 20 at step S209 and the logic flow goes to a step S211. Subsequently, another media server registers the media server 10 on the media server list corresponding to the session object and notifies the registration of the media server 10 to the connection management server 20. The connection management server can instruct another media server to access to the media server 10.

When there is no session object in another media server at the check result of the step S208, the media server 10 creates the session object, registers the terminal on the corresponding terminal list, and notifies the registration of the terminal to the connection management server 20 at step S210.

A connection process is completed through the above procedure.

At step S211, the terminals accessing to the same session perform group communication through the session object.

At this time, the active client of the network transforms a unicasting packet transmitted from the media server 10 into a multicasting packet and transmits the multicasting packet to the connection terminals connected to the session on own network. In addition, the active client transforms a multicasting packet of the connection terminal on own network into a unicasting packet and transmits the unicasting packet to the media server 10.

The active client transforms data to be transmitted into a multicasting packet and transmits the multicasting packet to the connection terminals connected to the session on own network. In addition, the active client transforms data to be transmitted into a unicasting packet and transmits the unicasting packet to the media server 10. At this time, the active client performs transformation and transmission to the media server 10 according to the unicasting transmission method without multicasting transmission when there is no connection terminal connected to the session on own network.

The media server 10 transmits the transmitted unicasting packet to the active client of each network registered on the terminal list of the session object and to other registered media servers on the media server list of the session object according to the unicasting transmission method.

Subsequently, another media server transmits the unicasting packet to the active clients of each network among the terminals registered on the terminal list of the session object. At this time, another media server does not transmit the unicasting packet to the media server registered on the media server list of the session object.

That is, when the media server relays a packet, packets transmitted from the directly accessing terminal are relayed and transmitted to the terminals registered on the terminal list of the session object and another media server registered on the media server list. However, the packet transmitted from another media server and registered on the media server list of the session object is transmitted only to the terminals registered on the terminal list. It is for preventing unlimited circulation or repetition of packet transmission.

Subsequently, when the terminals registered on the terminal list corresponding to the session object and other media servers registered on the media server list corresponding to the session object release the entire connections, the session object is removed and it is notified to the connection management server 20 at step S212. Subsequently, the connection management server 20 reflects the information and performs update.

The reason that the connection management server synthetically maintains information of the media servers in the present invention is for synthetically providing information in monitoring of the progress status and maintaining information required in that the connection management server 20 enables terminals receiving the service to continuously receive the service from another proper media server without stopping when the part of the media servers stop providing the service by an unintentional reason.

The present invention minimizes network traffic generated by the massive connection terminal process while maintaining the same session synchronization among the media servers providing the service for enabling massive group communication or interactive broadcasting among the massively distributed terminals.

The present invention provides a massive connectors process and a network distribution method by server clustering and a massive interactive group communication and interactive Internet broadcasting realizing method through network traffic reduction based on multicasting/unicasting transformation.

The present invention provides the group communication in real-time through synchronization of the distributed media servers having the same session object.

The present invention enables real-time group communication among a plurality of terminals included in the group relatively without increasing network traffic in comparison with simple unicasting based on the interactive multicasting/unicasting transformation on Internet where multicasting packet communication is not provided. Although the groups are locally and massively distributed, the present invention enables group communication to be performed without excess traffic.

In addition, the present invention can be applied to a massive group communication system, a terminal for massive group communication, an Internet broadcasting system, and a video conference system.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to certain preferred embodiments, it will be apparent to those skilled in the art that various changes and modifications may be made without departing from the scope of the invention as defined in the following claims.

What is claimed is:

1. A group communication method using a media server having a distributed structure in a terminal, comprising:
   receiving session information and connection management server information;
   checking whether there is a connection terminal pre-connected to a session corresponding to the session information on own network;
   when there is the connection terminal at the check result, accessing to a media server that the pre-connected terminal accesses;

when there is no connection terminal at the check result, receiving a media server list by accessing to the connection management server based on the connection management server information;
selecting and accessing to a media server in the provided media server list; and
performing group communication through a session object on the same session,
wherein in the selecting and accessing of the media server, the selected media server is at least one of a media server on a shortest route, a media server having a largest spatial bandwidth, and a media server having a smallest number of connection terminals.

2. The group communication method of claim 1, wherein the performing of group communication includes:
transforming a unicasting packet transmitted from the connected media server into a multicasting packet in an active client and transmitting the multicasting packet to connection terminals connected to the session on own network;
transforming a multicasting packet of the connection terminal on own network into a unicasting packet in the active client and transmitting the unicasting packet to the connected media server; and
transforming data to be transmitted by the active client into a multicasting packet, transmitting the multicasting packet to the connection terminals connected to the session in own network, transforming the multicasting packet into a unicasting packet and transmitting the unicasting packet to the connected media server.

3. The group communication method of claim 2, wherein in the transforming of data to be transmitted by the active client into a multicasting packet,
when there is no connection terminal connected to the session on own network, the active client transforms data to be transmitted into a unicasting packet and transmitting the unicasting packet to the connected media server without multicasting transmission.

4. The group communication method of claim 1, wherein in the checking of whether there is a connection terminal pre-connected to a session,
Echo is transmitted through the session information and it is checked whether there is a connection terminal pre-connected to the session on own network based on media server information included in a response message according to Echo transmission.

5. The group communication method of claim 4, wherein the session information includes a network address, a multicasting group address and a port number.

6. A group communication method using a media server having a distributed structure in a group communication system, comprising:
accessing a terminal to a media server,
wherein the accessing of a terminal to a media server comprises:
receiving session information and connection management server information in a terminal;
checking whether there is a connection terminal pre-connected to a session corresponding to the session information on own network;
when there is the connection terminal at the check result, accessing to a media server that the pre-connected terminal accesses;
when there is no connection terminal at the check result, receiving a media server list by accessing to the connection management server based on the connection management server information; and
selecting and accessing to a media server in the provided media server list, wherein the selected media server is at least one of a media server on a shortest route, a media server having a largest spatial bandwidth, and a media server having a smallest number of connection terminals;
registering, the terminal on a terminal list by the media server,
wherein the registering of the terminal on a terminal list by the media server comprises:
when there is a session object requested by the terminal, registering the terminal on a terminal list corresponding to the session object and notifying it to a connection management server;
when there is no session object requested by the terminal, checking whether there is a session object in another media server through the connection management server;
when there is the session object at the check result, accessing to another media server and notifying it to the connection management server; and
when there is no session object at the check result, creating a session object, registering the terminal on the terminal list and notifying it to the connection management server; and
providing group communication to the terminals accessing to the same session through the session object.

7. The group communication method of claim 6, further comprising:
when connection between terminals registered on the terminal list corresponding to the session object and other media servers registered on the media server list corresponding to the session object is released, removing the session object and notifying it to the connection management server.

8. The group communication method of claim 6, wherein a unicasting packet of the terminal is transmitted to active clients of each network registered on the terminal list of the session object and other media servers registered on the media server list of the session object according to a unicasting transmission method.

9. The group communication method of claim 8, wherein other media servers transmit the unicasting packet of the media server to the active clients of each network among the terminals registered on the terminal list of the session object.

10. The group communication method of claim 9, wherein when the media server accesses, other media servers register the media server on the media server list corresponding to the session object and notifies it to the connection management server.

11. A group communication system using a media server having a distributed structure, comprising:
a terminal configured to request a session;
a storing means configured to store session information and connection management server information;
an information providing means configured to provide session information and connection management server information corresponding to the session requested by the terminal;
a connection management means configured to update a session list of each media server, a terminal list corresponding to each session object of each media server, and a media server list; and
at least one media server configured to create/remove a session object, update the terminal list corresponding to each session object and the media server list, and provide group communication to terminals accessing the same session through the session object, wherein the terminal receives session information and connection management server information, the terminal checks whether there is a connection terminal pre-connected to a session corresponding to the session information on own network, when there is the connection terminal at the check result, the terminal accesses to a media server that the pre-connected terminal accesses, when there is no connection terminal at the check result, the terminal receives a media server list by accessing to the connection management server based on the connection management server information, the terminal selects and accesses to a media server in the provided media server list, wherein the selected media server is at least one of a media, server on a shortest route, a media server having a largest spatial bandwidth, and a media server having a smallest number of connection terminals, when there is a session object requested by the terminal, the media server registers the terminal on the terminal list corresponding to the session object and notifies it to the connection management means when there is no session object requested by the terminal, the media server checks through the connection management means whether there is the session object in another media server, if there is the session object in another media server, the media server accesses to another media server and notifies it to the connection management means, if there is no session object in another media server, the media server creates a session object, registers the terminal on the terminal list, notifies it to the connection management means; and the media server provides group communication to the terminals accessing to the same session through the session object.

12. The group communication system of claim 11, wherein the media server transmits a unicasting packet of the terminal to active clients of each network registered on the terminal list of the session object and other media servers registered on the media server list of the session object according to a unicasting transmission method.

13. The group communication system of claim 12, wherein when connection between terminals registered on the terminal list corresponding to the session, object and other media servers registered on the media server list corresponding to the session object is released, the media server removes the session object and notifies it to the connection management means.

* * * * *